United States Patent
Tanaka et al.

(10) Patent No.: US 9,539,505 B2
(45) Date of Patent: Jan. 10, 2017

(54) GAME DEVICE AND COMPUTER-READABLE STORAGE MEDIUM

(71) Applicant: Kabushiki Kaisha SEGA, Tokyo (JP)

(72) Inventors: Tomoharu Tanaka, Tokyo (JP); Minami Kumazawa, Tokyo (JP); Seiki Saito, Tokyo (JP); Toshiyuki Mukaiyama, Tokyo (JP)

(73) Assignee: KABUSHIKI KAISHA SEGA, Tokyo (JP)

( * ) Notice: Subject to any disclaimer, the term of this patent is extended or adjusted under 35 U.S.C. 154(b) by 183 days.

(21) Appl. No.: 14/466,297

(22) Filed: Aug. 22, 2014

(65) Prior Publication Data
US 2014/0364222 A1 Dec. 11, 2014

Related U.S. Application Data

(63) Continuation of application No. PCT/JP2013/054146, filed on Feb. 20, 2013.

(30) Foreign Application Priority Data

Feb. 23, 2012 (JP) ................................. 2012-037758

(51) Int. Cl.
*A63F 13/2145* (2014.01)
*A63F 13/42* (2014.01)
(Continued)

(52) U.S. Cl.
CPC ........... *A63F 13/2145* (2014.09); *A63F 13/42* (2014.09); *A63F 13/5375* (2014.09);
(Continued)

(58) Field of Classification Search
CPC .... A63F 13/20; A63F 13/214; A63F 13/2145; A53F 2300/1068; A53F 2300/1075
(Continued)

(56) References Cited

U.S. PATENT DOCUMENTS

2009/0174679 A1* 7/2009 Westerman ......... G06F 3/03547
345/173
2011/0136558 A1* 6/2011 Terada .................... A63F 13/10
463/4
(Continued)

FOREIGN PATENT DOCUMENTS

| JP | 2010-233958 | 10/2010 |
|---|---|---|
| JP | 2011-138457 | 7/2011 |
| JP | 2012-249690 | 12/2012 |

OTHER PUBLICATIONS

Mikuge no Tatsuten ka 'Miku Flick' ni Sega no Miku-san Al o Kanjita, [online], Mar. 13, 2012 (Mar. 13, 2012), ITmedia Gadget,, [retrieval date Mar. 15, 2013 (Mar. 15, 2013)], Internet <URL:http://gadget.itmedia.co.jp/gg/articles/1203/13/news089.html>.

*Primary Examiner* — Allen Chan
(74) *Attorney, Agent, or Firm* — Norris McLaughlin & Marcus, P.A.

(57) ABSTRACT

A game device having a touch panel to accept an input by a flick operation according to a contact operation and a slide operation on the touch panel, instructs a flick operation by displaying on the touch panel a screen that instructs a flick operation from a predetermined position in a predetermined direction on the touch panel at a predetermined timing, detects a contact start position on the touch panel by the flick operation, detects the slide direction from the contact start position on the touch panel by the flick operation, detects the contact timing on the touch panel by the flick operation and determines whether to accept or reject the flick operation based on a comparison between the detected contact start position and the predetermined position, a comparison between the detected slide direction and the predetermined direction, and a comparison between the detected contact timing and the predetermined timing.

15 Claims, 10 Drawing Sheets

(51) Int. Cl.
*G06F 3/0488* (2013.01)
*A63F 13/5375* (2014.01)

(52) U.S. Cl.
CPC .. *G06F 3/04883* (2013.01); *A63F 2300/1075* (2013.01); *A63F 2300/6045* (2013.01); *A63F 2300/646* (2013.01)

(58) Field of Classification Search
USPC .......................................................... 463/31
See application file for complete search history.

(56) References Cited

U.S. PATENT DOCUMENTS

| | | | |
|---|---|---|---|
| 2011/0163981 A1 | 7/2011 | Ito et al. | |
| 2013/0293510 A1* | 11/2013 | Clifton | G06F 3/044 345/174 |
| 2013/0337901 A1* | 12/2013 | Saruta | A63F 13/10 463/25 |

* cited by examiner

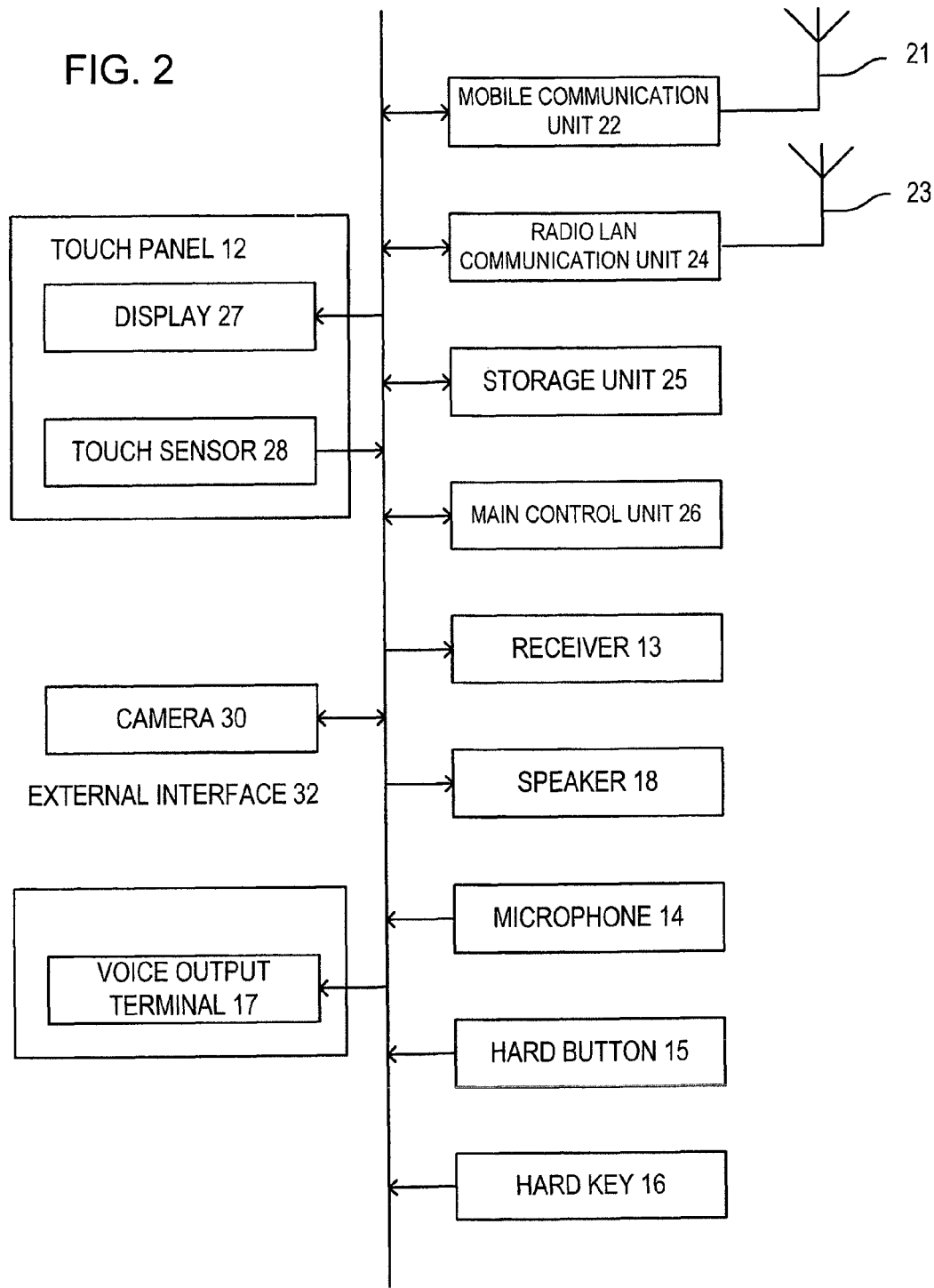

FIG. 7

| TIME | MEASURE | BEAT | LYRICS | "a" ROW | DIRECTION |
|---|---|---|---|---|---|
| 0.00000 | 1 | 1 | | | |
| 0.21898 | | | | | |
| 0.43796 | | 2 | | | |
| 0.65693 | | | | | |
| 0.87591 | | 3 | | | |
| 1.09489 | | | | | |
| 1.31387 | | 4 | | | |
| 1.53285 | | | | | |
| 0.00000 | 1 | 1 | | | |
| 0.21898 | | | | | |
| 0.43796 | | 2 | | | |
| 0.65693 | | | | | |
| 0.87591 | | 3 | | | |
| 1.09489 | | | | | |
| 1.31387 | | 4 | | | |
| 1.53285 | | | | | |
| 0.00000 | 1 | 1 | Sa | Sa | • |
| 0.21898 | | | | | |
| 0.43796 | | 2 | Ku | Ka | ↑ |
| 0.65693 | | | | | |
| 0.87591 | | 3 | Ra | Ra | • |
| 1.09489 | | | | | |
| 1.31387 | | 4 | | | |
| 1.53285 | | | | | |
| 0.00000 | 1 | 1 | Sa | Sa | • |
| 0.21898 | | | | | |
| 0.43796 | | 2 | Ku | Ka | ↑ |
| 0.65693 | | | | | |
| 0.87591 | | 3 | Ra | Ra | • |
| 1.09489 | | | | | |
| 1.31387 | | 4 | | | |
| 1.53285 | | | | | |
| 0.00000 | 1 | 1 | Ya | Ya | • |
| 0.21898 | | | | | |
| 0.43796 | | 2 | Yo | Ya | ↓ |
| 0.65693 | | | | | |
| 0.87591 | | 3 | I | A | ← |
| 1.09489 | | | | | |
| 1.31387 | | 4 | No | Na | ↓ |
| 1.53285 | | | | | |
| 0.00000 | 1 | 1 | So | Sa | ↓ |
| 0.21898 | | | | | |
| 0.43796 | | 2 | Ra | Ra | • |
| 0.65693 | | | | | |
| 0.87591 | | 3 | Ha | Ha | • |
| 1.09489 | | | | | |
| 1.31387 | | 4 | | | |
| 1.53285 | | | | | |
| ... | | | ... | | |

1

GAME DEVICE AND COMPUTER-READABLE STORAGE MEDIUM

CROSS-REFERENCE TO RELATED APPLICATIONS

This application is a continuation application of International Application PCT/JP2013/054146 filed on Feb. 20, 2013, claiming priority based on Japanese Patent Application No. 2012-037758, filed Feb. 23, 2012 and designated the U.S., the entire contents of which are incorporated herein by reference.

FIELD

The present invention relates to a game device including a touch panel that can accept the input of information by a flick operation, and a computer-readable storage medium executed by the game device.

BACKGROUND

In a portable game device (including a portable telephone (e.g. smartphone) and a tablet terminal that can execute a computer game) that has a touch panel which can accept input by a contact operation on a display screen, a game executed by determining whether an operation input corresponding to the operation instruction displayed on the display screen is performed correctly is known.

As an input operation on a touch panel, a "flick operation", where flicking is performed on the surface of the touch panel, has been introduced. A flick operation is an operation where contact with a touch panel is performed with a finger or the like, that can quickly slide on the touch panel surface in a predetermined direction and then release the contact, and this operation is used for a scrolling operation or for a character input operation on the display screen, for example. To input characters by the flick operation, the user contacts a predetermined character displayed on the screen, then a plurality of character candidates is displayed in a cross or arc shape centered around this character, and the user slides their finger from the predetermined character to a desired character candidate and releases their finger from contacting the screen, whereby the user selects this character candidate and determines the input character.

As a game using this flick operation, Patent document 1 (Japanese Patent Application Laid-open No. 2010-233958) discloses a game device which instructs the user to perform the flick operation as an operation instruction, and determines whether the operation timing, the operation direction, and the operation quantity of the flick operation are implemented as instructed.

However in the case of the game device of Patent document 1, an operation direction to-be-inputted is displayed on the screen, and the user performs the flick operation according to the instruction for the operation direction, therefore operation is simple with few variations, resulting in the user easily becomes bored.

SUMMARY

With the foregoing in view, it is an object of the present invention to provide a game device that executes a highly interesting game using the flick operation, and a computer-readable storage medium storing a program executed by the game device as a computer, and a method implemented by the game device.

According to an aspect of the invention, it is provided a game device which has a touch panel, and accepts an input by a flick operation according to a contact operation and a slide operation on the touch panel to execute a game, the device comprising: an instruction unit which instructs a flick operation by displaying on the touch panel a screen that instructs a flick operation from a predetermined position in a predetermined direction on the touch panel at a predetermined timing; a position detection unit which detects a contact start position on the touch panel by the flick operation; a direction detection unit which detects the slide direction from the contact start position on the touch panel by the flick operation; a timing detection unit that detects the contact timing on the touch panel by the flick operation; and a determination unit that determines whether to accept or reject the flick operation based on a comparison between the detected contact start position and the predetermined position, a comparison between the detected slide direction and the predetermined direction, and a comparison between the detected contact timing and the predetermined timing.

According to an aspect of the invention, it is provided A computer-readable storage medium storing a program causing a computer and the method implemented by the computer, the computer having a touch panel and accepts an input by a flick operation including a contact operation and a slide operation on the touch panel, to execute a process, comprising: an instructing step instructing a flick operation by displaying on the touch panel a screen that instructs a flick operation from a predetermined position in a predetermined direction on the touch panel at a predetermined timing; a position detecting step detecting a contact start position on the touch panel by the flick operation; a direction detecting step detecting the slide direction from the contact start position on the touch panel by the flick operation; a timing detecting step detecting the contact timing on the touch panel by the flick operation; and a determining step determining whether to accept or reject the flick operation based on a comparison between the detected contact start position and the predetermined position, a comparison between the detected slide direction and the predetermined direction, and a comparison between the detected contact timing and the predetermined timing.

According to this invention, a game that determines the contact start position, the slide direction and the contact timing of the flick operation is executed, whereby variations of the input operation increase, and a highly interesting game can be implemented.

BRIEF DESCRIPTION OF DRAWINGS

FIG. 2 is a block diagram depicting a general configuration of the game device according to this embodiment;

FIG. 7 is an example of reference time data when each character of lyrics that pass through a frame from the start of play of the song;

DESCRIPTION OF EMBODIMENTS

Embodiments of the present invention will now be described with reference to the drawings. The embodiments are intended to assist in understanding the invention, and are not for limiting the technical scope of the invention.

Figure 1:
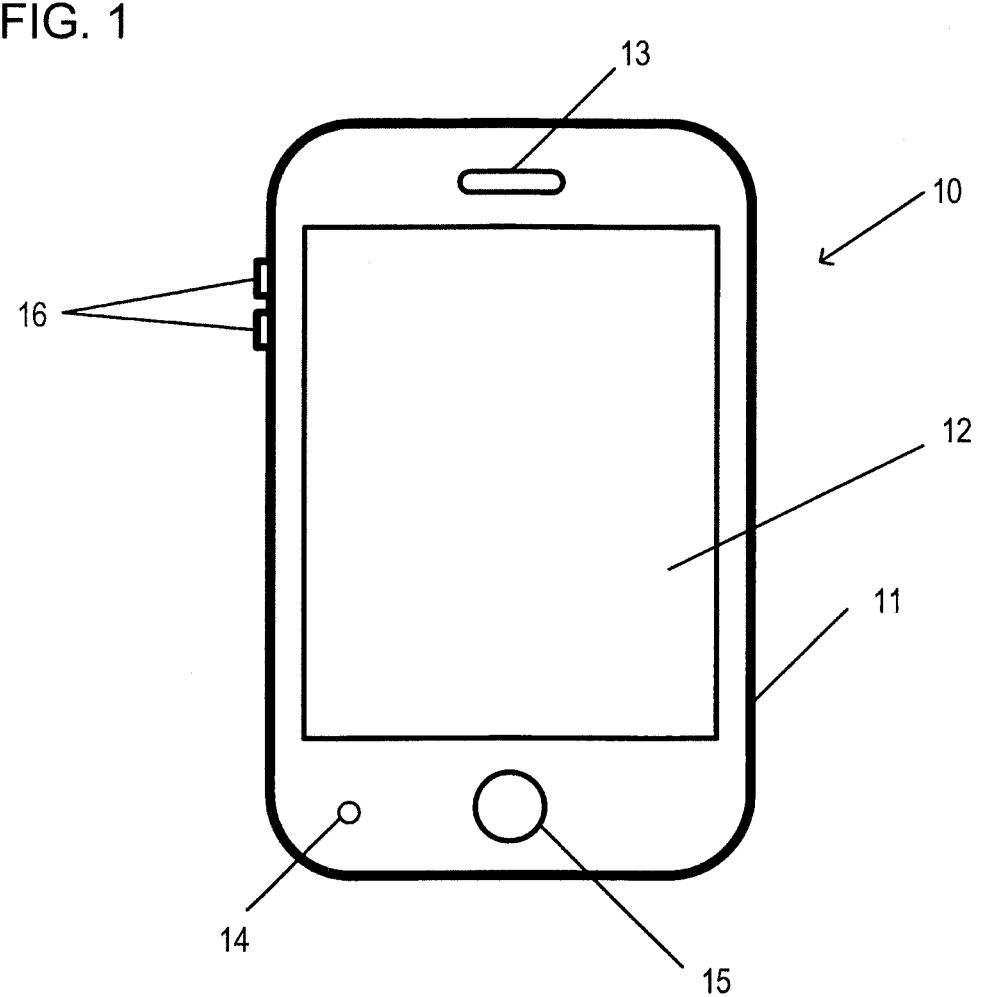
FIG. 1 is a diagram depicting an example of an appearance of a game device according to this embodiment.

FIG. 1 is a diagram depicting an example of an appearance of a game device according to this embodiment. For example, the game device is a portable telephone 10 that has a rectangular plate-like housing 11 and a touch panel 12 that takes up most of one surface of the housing 11.

A receiver 13, a microphone 14 and a hard button 15 are disposed on the front surface where the touch panel 12 is installed. An external interface, such as a hard key 16, a speaker (see FIG. 2) and a voice output terminal (see FIG. 2), are disposed on the side face and bottom face of the portable telephone 10. A camera (see FIG. 2) is disposed on the back face. The game device is not limited to a portable telephone, but can be an electronic apparatus having a touch panel, such as a portable terminal that is wirelessly connected to a network, or a tablet type terminal, regardless whether the terminal is a dedicated-game terminal or is a general use terminal.

FIG. 2 is a block diagram depicting a general configuration of the game device according to this embodiment. In addition to the above mentioned composing elements, the game machine 10 includes at least a mobile communication antenna 21, a mobile communication unit 22, a radio LAN communication antenna 23, a radio LAN communication unit 24, a storage unit 25 and a main control unit 26, and further includes such external interfaces 32 as a speaker 18, a camera 30 and a voice output terminal 17.

The touch panel 12 has functions of both a display device and an input device, and is constituted by a display 27 having a display function and a touch sensor 28 which has an input function. The display 27 is a general display device, such as a liquid crystal display or an organic electroluminescence (EL) display. The touch sensor 28 is constituted by an element which is disposed on the top surface of the display 27, and detects a contact operation, and a transparent operation surface layered thereon. For the contact detection method of the touch sensor 28, any conventional method, such as electrostatic capacitance, resistance film (pressure sensitive) or electromagnetic induction may be used.

As the display device, the touch panel 12 displays game images generated by the main control unit 26 that executes a computer game program. As the input device, the touch panel 12 accepts an operation input by detecting an operation of a contacting object (including a human finger of the user and a touch stylus, hereafter referred to as "finger") that contacts the operation surface, and provides the information on the contact position to the main control unit 26. The operation of the finger is detected as coordinates' information that indicates a position or an area of the contact point, and the coordinates' information is represented by coordinate values on two axes in the short side direction and the long side direction of the touch panel 12.

Figure 3A:
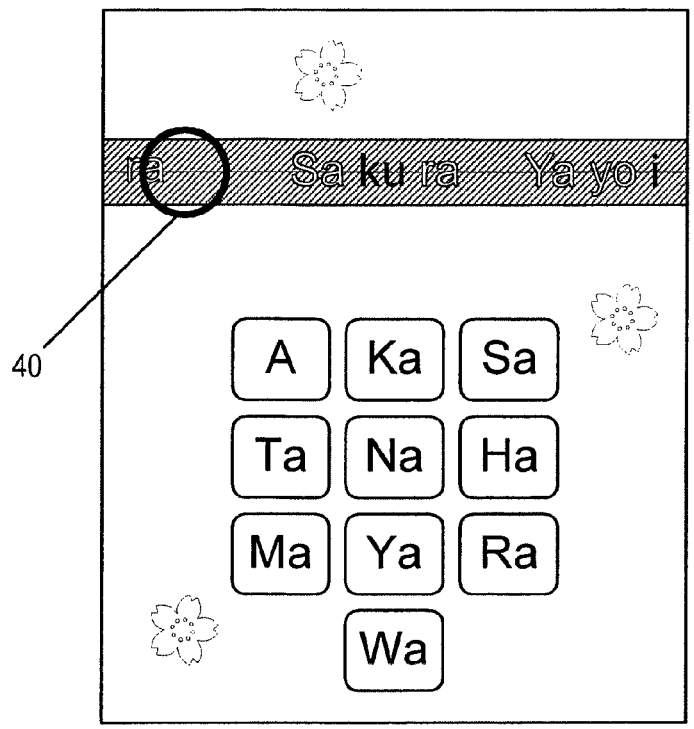
FIGS. 3A and 3B are screen examples of a computer game executed by the game device according to an embodiment of the present invention.
Figure 3B:
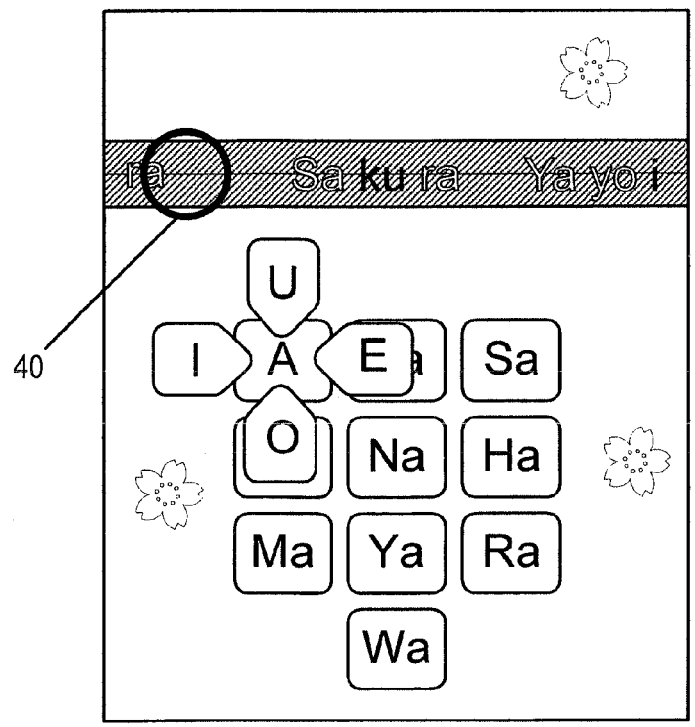

FIGS. 3A and 3B are screen examples of a computer game executed by the game device according to this embodiment. The computer game that is executed by the game device will be described with reference to the screen examples in FIG. 3. For example, a computer program, downloaded from a network via the mobile communication unit 22 or the radio LAN communication unit 24, is stored (installed) in the storage unit 25, and the main control unit 26 executes this computer program, and performs game progress control and screen display control. The computer program may be stored in the storage unit 25 in advance, or may be read from and stored to another storage medium (e.g. a memory card) via a predetermined connection interface.

As shown in FIG. 3A, in this game, the lyrics of a song are displayed on the game screen, which is displayed on the touch panel 12. The character string of the lyrics moves and is displayed from the right end to the left end of the touch panel 12 like a "telop", and a timing frame 40, which is large enough for one character of the flowing lyrics to enter, is displayed.

A virtual keyboard for the user to input characters is also displayed on the touch panel 12. The virtual keyboard is displayed such that the representative keys framing respective characters of the "a" row of the Japanese syllabary, such as "a", ka", "sa" . . . are arrayed two-dimensionally. To input "a", the user contacts a display area (main area) framing the character of the representative key "a" with their finger, and releases their finger in the display area of "a", whereby "a" is selected and inputted. To input another character of "a" row, such as "i", "u", "e" or "o", as shown in FIG. 3B, the user contacts the representative key "a" with their finger, then the character candidate keys framing the respective characters "i", "u", "e" and "o" are displayed adjacent to the representative key "a" in a cross shape. If the finger contacting the representative key is slid to a display area (sub-area) of a character candidate key to-be-inputted, and is released from the touch panel 12 in that area, the character of the character candidate key is inputted. This operation to select a character of the character candidate keys, displayed around the representative key, is a flick operation.

This game is a character input game, where at a predetermined timing when a character enters the timing frame 40 on a line through which lyrics flow, the user is instructed to input the character within the timing frame using the virtual keyboard, and whether the user can input the character in the timing frame by the flick operation at a predetermined timing is determined.

The characters that the user must input are not all the characters constituting the lyrics, but only a part of the characters which are arbitrarily selected at appropriate intervals, and the characters to-be-inputted, when displayed, can be distinguished from the other characters. For example, in FIGS. 3A and 3b, characters to-be-inputted are displayed as black characters, and the other characters are displayed as outline characters, so that these characters can be distinguished by color. At a timing when a character to-be-inputted, out of the character string of the lyrics which are flowing [on screen], is in the timing frame 40, the user performs the operation to input the character in the timing frame.

It is preferable to provide an auxiliary display to allow the user to know a contact start position corresponding to the character to-be-inputted and the contact timing.

Figure 4A:
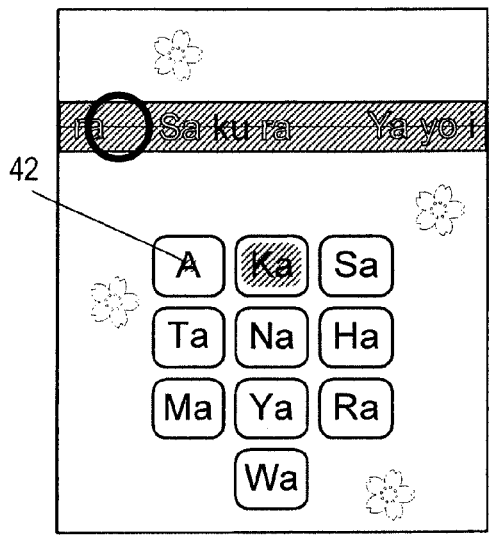
FIGS. 4A, 4B and 4C are screen examples of an auxiliary display of the contact start position and the contact timing.
Figure 4B:
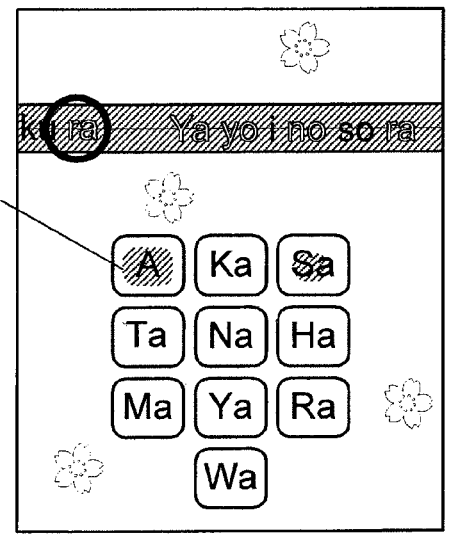
Figure 4C:
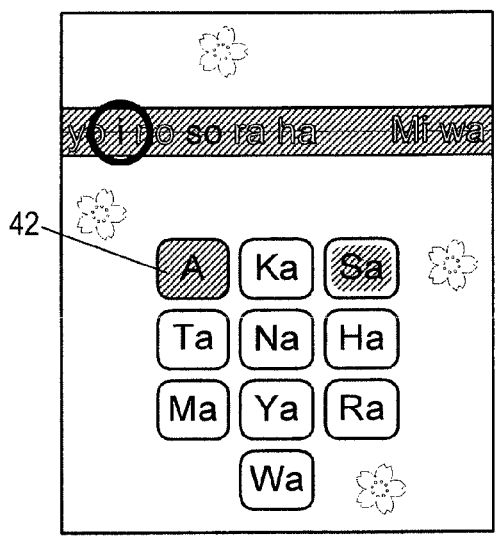

FIGS. 4A, 4B and 4C are screen examples of the auxiliary display of the contact start position and the contact timing.

In the auxiliary display, a mark 42, of which size changes as the character to-be-inputted approaches the timing frame (as the contact timing approaches) is displayed in the display area of the representative key of the character to-be-inputted. For example, if the next character to-be-inputted is "i", a semitransparent frame image (mark) 42, of which size gradually increases as "i" approaches the timing frame, is superposed onto the display area of the representative key "a", The mark 42 starts to be displayed with a predetermined minimum size at a predetermined time (predetermined length) before the timing when "i" enters the timing frame (contact timing) (FIG. 4A), the size increases as "i" approaches the frame (FIG. 4B), and reaches the maximum size at the timing when "i" enters the frame (contact timing) (FIG. 4C), and this maximum size matches with the size of the frame of the representative key "ka". The mark 42 corresponding to "ku" disappears when the mark 42 reaches the maximum size, Marks corresponding to the subsequent characters to-be-inputted are also displayed sequentially. In FIGS. 4A, 4B and 4C, marks 42 corresponding to a character to-be-inputted, other than "i", are shown as well. Thereby the user can check the display position of the frame image and the size thereof, and can easily recognize the contact start position corresponding to the next character to-be-inputted and the contact timing by the flick operation. The size of the mark 42 can be changed based on the difference between the time when the character to-be-inputted enters the timing frame and the current time.

It is also preferable to have an auxiliary display allowing the user to know the slide direction in the flick operation.

Figure 5:
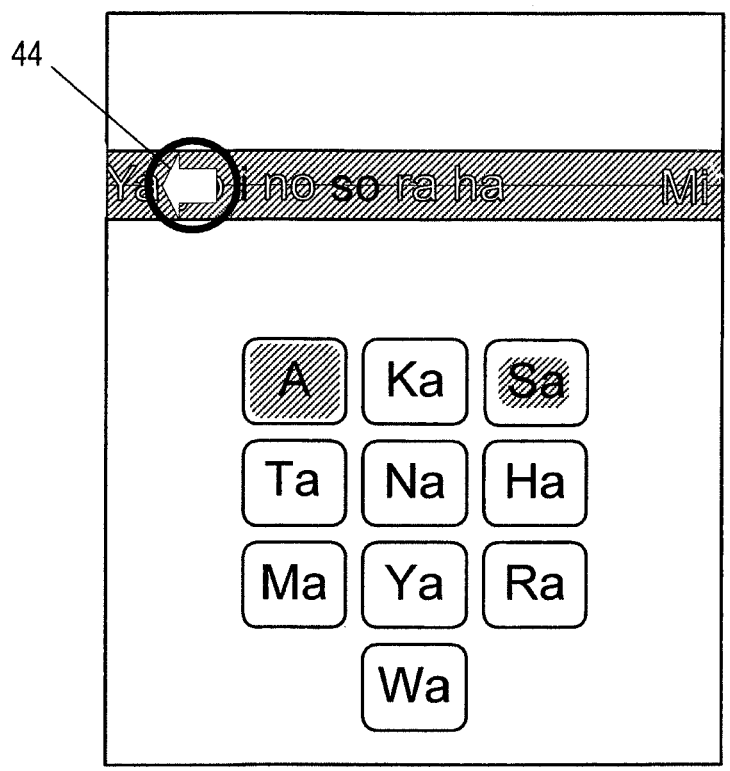
FIG. 5 is a screen example of an auxiliary display of the slide direction of the flick operation.

FIG. 5 is a screen example of the auxiliary display of the slide direction of the flick operation. In the auxiliary display of the slide direction, a semitransparent arrow mark 44, to indicate the slide direction, is displayed in the timing frame, as shown in FIG. 5. In the input operation of the next character to-be-inputted, the user can easily recognize the slide direction of their finger in the flick operation. If the next character to-be-inputted is a character corresponding to a representative key, such as "a", "ka" and "sa", the character is inputted by the contact operation to this representative key and by the contact release operation from this key, without performing the flick operation. Therefore in this case the arrow mark is not displayed.

In this way, at a timing when a character to-be-inputted, out of the lyrics flowing like a telop, enters the timing frame, the user performs an operation to input a character from the virtual keyboard using the flick operation.

Figure 6:
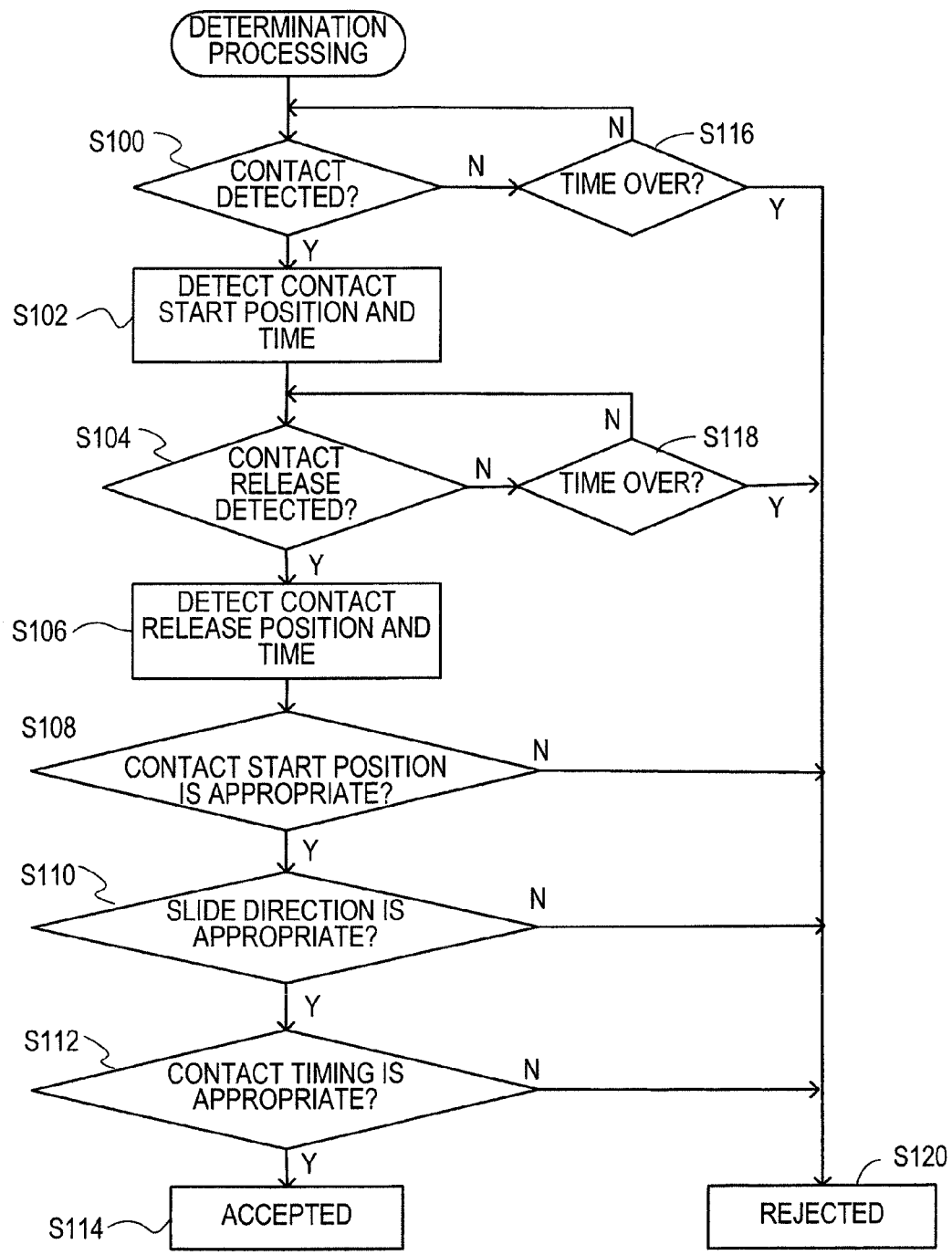
FIG. 6 is a flow chart depicting the determination processing.

Now the processing to determine whether or not the user inputted the character appropriately will be described with reference to FIG. 6. FIG. 6 is a flow chart depicting the determination processing. This determination processing is executed by the main control unit 26 of the game device.

As an input operation for each character to-be-inputted, it is detected whether or not the first contact operation is performed (S100). A reference time when each character to-be-inputted enters the timing frame is predetermined (see FIG. 7), and if the reference time exceeds the predetermined time (S116), it is determined that the input operation for this character was not performed, and the determination result becomes "Rejected" (S120). If the first contact operation is detected within the predetermined time from the reference time, the contact start position (coordinate values) and the contact start time are acquired (S102).

After the contact operation detection, it is detected whether or not the contact release operation is performed as an input operation for the character to-be-inputted (S104). If the reference time exceeds the predetermined time to perform the contact release operation (S118), that is, if the contacting state continues exceeding the predetermined time from the reference time, it is regarded that the input operation for this character is incomplete, and the determination result becomes "Rejected" in this case as well (S120). If the contact release operation is detected within the predetermined time from the reference time, the contact release position (coordinate values) and the contact release time are acquired (S106).

To determine the input appropriateness of each character, it is determined whether a character to-be-inputted is correctly inputted at a timing when the character is in the timing frame. First in S108, it is determined whether the detected contact start position is in the area of the "a" row corresponding to the character to-be-inputted. If not, the result becomes "Rejected" (S120). If the result is "Accepted", then whether to accept or reject the slide direction is determined in S110. The slide direction is determined based on the contact start position and the contact release position, for example. It is determined whether the slide direction is the direction corresponding to the character to-be-inputted. If not, the result becomes "Rejected" (S120). By the processing operations in S108 and S110, whether the character to-be-inputted is inputted or not is determined. For example, if the character to-be-inputted is "i", then it is determined whether "i" is inputted correctly or not by determining whether the contact start position is included in the display area of "a", and whether the slide position is correct, that is whether the finger is slid from the contact start position and the display area of "i" is included in the area up to the contact release position. If the character to-be-inputted is a character in the "a" row, then the flick operation is not performed, hence it is determined whether the correct character is inputted only by determining whether the contact start position is correct, without determining whether the slide direction is correct.

Then it is determined whether the character to-be-inputted is correctly contacted and inputted at the timing when the character is in the timing frame (S112). The appropriateness of the contact timing is determined using two timings: the contact start timing and the contact release timing, for example. The reference time when each character of the lyrics of a song pass through the frame (e.g. the time when the center coordinates of each character pass through the center coordinates of the frame) from the start of playing the song is provided and stored in the storage unit 25 in advance.

FIG. 7 is an example of the reference time data when each character of the lyrics that pass through the frame from the start of playing the song. FIG. 7 presents an elapsed time from the start of the play of each character of the lyrics (the time when each character is voice-outputted from the speaker), that is, the reference time when each character passes through the frame. A character in the "a" row corresponding to each character and the slide direction thereof (excluding the characters in the "a" row) are also presented.

The contact timing of a character is determined by comparing the reference time with the contact start time and the contact release time. Specifically, if the reference time is Ts, the contact start time is Ti and the contact release time is To, then |Ts−Ti| and |Ts−To| are calculated, and whether each of these values is within a comparative value P is determined. P is a permissible error time that can be set arbitrarily.

Figure 8A:
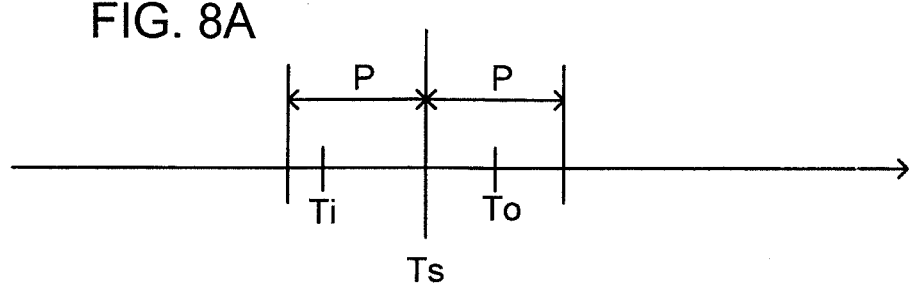
FIGS. 8A, 8B and 8C are diagrams depicting a contact timing determination processing.
Figure 8B:
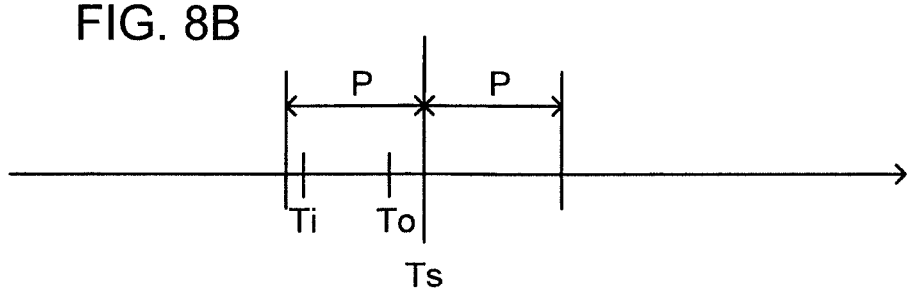
Figure 8C:
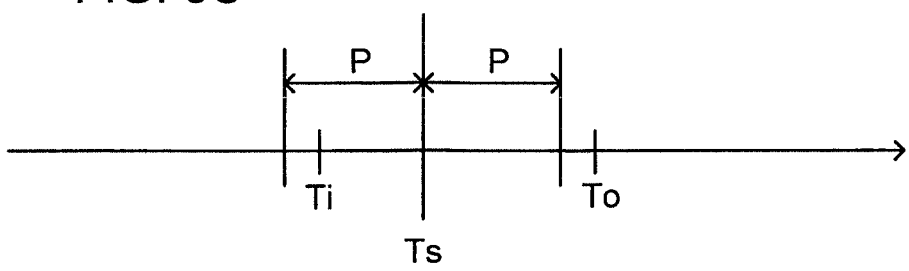

FIGS. 8A, 8B and 8C are diagrams depicting the contact timing determination processing. The relationship of the contact start time Ti, the contact release time To, the reference time Ts of the character to-be-inputted, and the permissible error time P is shown. If both are within the permissible error time P before and after the reference time Ts, as shown in FIG. 8A, that is, if $|Ts-Ti| \leq P$ and $|Ts-To| \leq P$ then it is determined that the character is inputted at a correct contact timing. Even if the contact start time Ti and the contact release time To are both before or after the reference time Ts, but within the permissible error time P from the reference time Ts, as shown in FIG. 8B, then it is determined that the contact timing is correct. If, on the other hand, $|Ts-Ti| \leq P$ and $|Ts-To| > P$ or $|Ts-Ti| > P$ (in the case of FIG. 8C) or $|Ts-To| \leq P$ in other words, if at least one of the contact start time Ti and the contact release time To is outside the permissible error time P before and after the reference time Ts, then the contact timing is determined as incorrect.

The correct contact timing may be determined by classifying the result into a plurality of ranks.

Figure 9A:
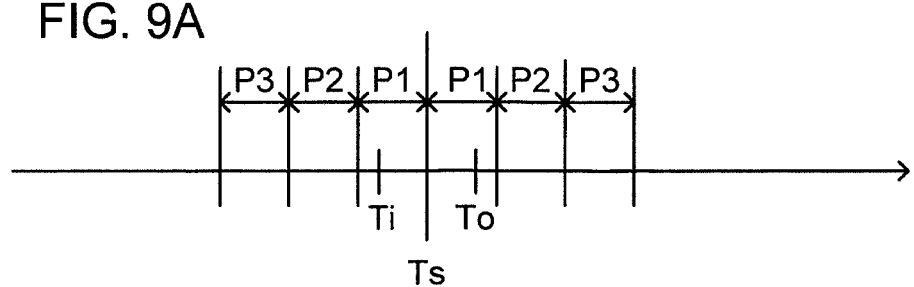
FIGS. 9A, 9B and 9C are diagrams depicting an example of determining the contact timing by classifying the result into a plurality of ranks.
Figure 9B:
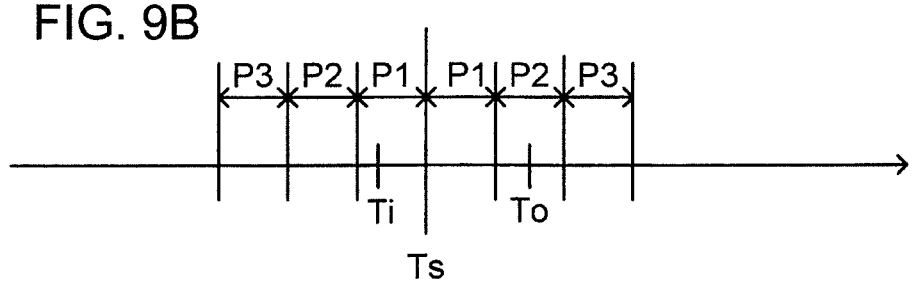
Figure 9C:
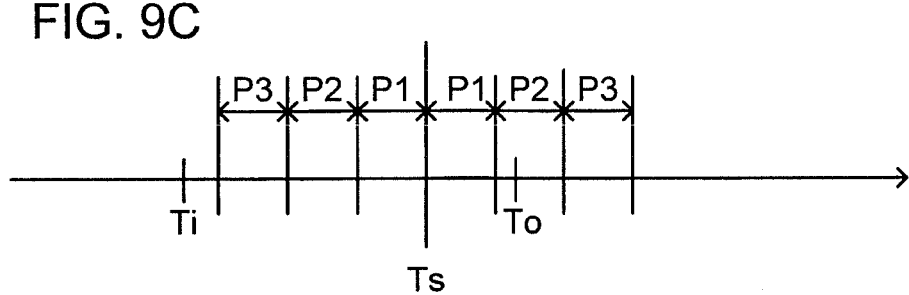

FIGS. 9A, 9B and 9C are diagrams depicting an example of determining the contact timing by classifying the result into a plurality of ranks. In the case of FIG. 9, three permissible error times P1, P2 and P3 are set in descending order, and the calculations of $|Ts-Ti|$ and $|Ts-To|$ are compared with each permissible error times P1, P2 and P3. In concrete terms, $|Ts-Ti|$ and $|Ts-To|$ are ranked, such as

| | |
|---|---|
| $\|Ts-Ti\| \leq P1$ and $\|Ts-To\| \leq P1$ | Rank A |
| $P1 < \|Ts-Ti\| \leq P2$ and $P1 < \|Ts-To\| \leq P2$ | Rank B |
| $P2 < \|Ts-Ti\| \leq P3$ and $P2 < \|Ts-To\| \leq P3$ | Rank C |
| $\|Ts-Ti\| > P3$ and $\|Ts-To\| > P3$ | Rank D | where the evaluation (rank) is lower as the values of $|Ts-Ti|$ and $|Ts-To|$ are greater, and the determination result of either $|Ts-Ti|$ or $|Ts-To|$ of which rank is lower is regarded as the determination result of the contact timing.

For example, if $|Ts-Ti| < P1$ and $|Ts-To| < P1$, as shown in FIG. 9A, the determination result is Rank A, the highest evaluation. $|Ts-Ti| \leq P$ and $P1 < |Ts-To| \leq P2$ as shown in FIG. 9B, the determination result is rank B, a lower evaluation. And if $|Ts-Ti| > P3$ and $P1 < |Ts-To| \leq P2$ as shown in FIG. 9C, the determination result is Rank D, the lowest evaluation.

The processing to determine the contact timing is not limited to the processing using the contact start timing and the contact release timing described above, but may be a processing using only the contact start timing, for example. In other words, appropriateness is determined (including the ranking determination) by comparing $|Ts-Ti|$ with the permissible error time P.

The content timing may be represented by a number of frames instead of time. Since 1 frame=1/frame ratio (seconds), time may be converted into a number of frames, and used for operation and comparison to determine the contact timing.

If the result of the contact timing appropriateness determination in S112 in FIG. 6 is not appropriate, the determination result becomes "Rejected" (S120). If appropriate, it is assumed that the character to-be-inputted is correctly inputted at the timing when the character is in the timing frame, and since the results in S108 and S110 are "Accepted", the final result becomes "Accepted" (S114). Depending on the final determination that is accepted (S114) or rejected (S120), various game progress controls are performed, such as an increase/decrease in game score, and an extension/reduction of game time. In this way if the contact start position, the slide direction and the contact timing of the flick operation are determined in the game using the flick operation, variations of the input operation increase, and the game becomes more interesting and amusing than a game where data is simply inputted by the flick operation. Further, character input by the flick operation can also be learned as the game is played.

After the game is over, statistical data on whether the character is correctly inputted may be displayed for each character inputted during the game. Statistical data is calculated by the main control unit 26, and is stored in the storage unit 25.

Figure 10A:
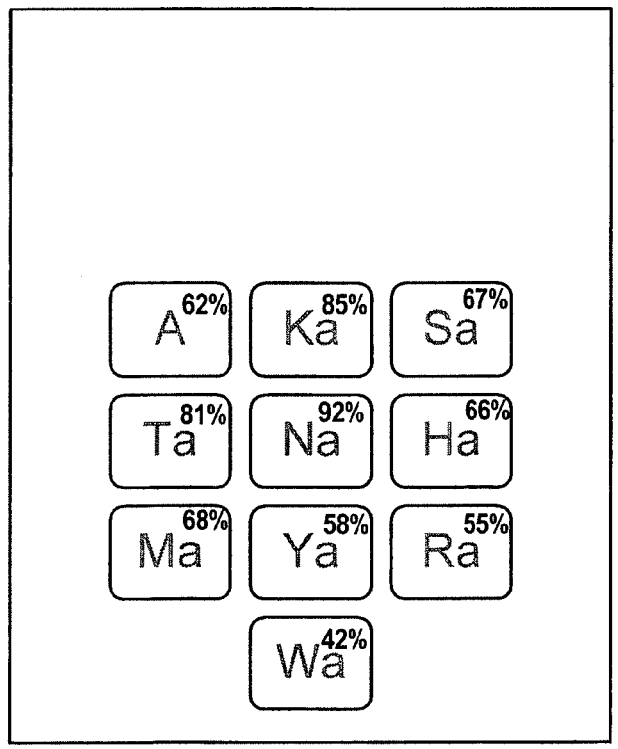
FIGS. 10A and 10B are examples of a statistical data display screen.
Figure 10B:
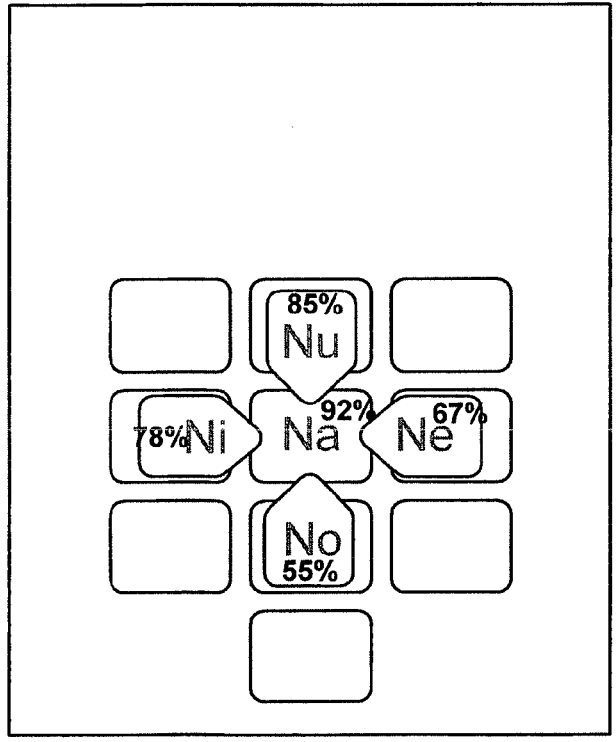

FIGS. 10A and 10B are examples of the statistical data display screen. In FIG. 10A, a ratio of correct input of the respective character is displayed in the display area of each character of the "a" row. For example, if the area of "na" is contacted, as shown in FIG. 10B the other characters of the "na" column, that is, "ni", "nu", "no" and no are displayed in a cross shape around "na", and the ratio of correct input of the respective character is displayed in the display area of each character with respect to the "na" column as well. It is preferable that the display area of each character is displayed as color coded based on the value of the ratio, so that the user can recognize at first glance a character of which input is easy and a character of which input is difficult. In the display screen in FIG. 10A, the statistical result (e.g. average, total) of each column on the ratio of correct input of each character included in the column may be displayed in the display area of each character of the "a" row.

The present invention is not limited to this embodiment, but includes design changes including various modifications and variations, that can be made by an individual skilled in the art, within the scope of not departing from the spirit of the invention. For example, characters are movably displayed with respect to a fixed timing frame in this embodiment, but the character string of the lyrics may be fixed in the display, and the timing frame, a cursor or the like may be moved, or the color of the characters may be changed along with movement. The contact timing may be instructed not by displaying the timing frame but by voice or the like.

In the above embodiment, the contact start position and the slide direction in the flick operation are instructed using the character to be inputted, but the instruction mode is not limited to this, but any symbol may be used if the contact start position and the slide position can be indicated. For example, instead of the characters of the "a" row in the main areas of this embodiment, such numbers as "1" and "2" may be used, so that the main area and the sub-area are instructed as "1-i" or "2-e" instead of instructing a character to-be-inputted. Or instead of the characters "i", "u", "e" and "o" in each sub-area, each sub-area may be color coded with a different color, such as "red", "blue", "yellow" and "green", so that the main area and the sub-area are instructed as "red a" or "yellow na" instead of instructing the character to-be-inputted.

The invention claimed is:

1. A game device which has a touch panel, and accepts an input by a flick operation according to a contact operation and a slide operation on the touch panel to execute a game, the device comprising:
  an instruction unit which instructs a flick operation by displaying on the touch panel a screen that instructs a flick operation from a predetermined position in a predetermined direction on the touch panel at a predetermined timing;
  a position detection unit which detects a contact start position on the touch panel by the flick operation;

a direction detection unit which detects the slide direction from the contact start position on the touch panel by the flick operation;
a timing detection unit that detects the contact timing on the touch panel by the flick operation; and
a determination unit that determines whether to accept or reject the flick operation based on a comparison between the detected contact start position and the predetermined position, a comparison between the detected slide direction and the predetermined direction, and a comparison between the detected contact timing and the predetermined timing.

2. The game device according to claim 1, wherein
the contact timing includes both a contact start timing at which a contact on the touch panel is started and a contact release timing at which the contact on the touch panel is released.

3. The game device according to claim 2, wherein
the determination unit calculates a difference value between the contact start timing and the predetermined timing, and a difference value between the contact release timing and the predetermined timing, and determines whether to accept or reject the flick operation by using a greater one of the difference values.

4. The game device according to claim 1, wherein
a main area corresponding to each character of the "a" row of the Japanese kana syllabary is displayed on the touch panel and each character of the "a" row can be inputted by contacting the corresponding main area, and if a main area is contacted, sub-areas, corresponding to each character of the "i" row to the "o" row in the same column as the character of the "a" row in the contacted main area, are displayed around the main area which is contacted, and each character of the "i" row to the "o" row can be inputted by the slide operation from the main area to the sub-area, and
the instruction unit displays the character to-be-inputted on the touch panel, and instructs the main area that is to be contacted in order to input the character to-be-inputted, and the direction of slide from the main area to the sub-area, as the predetermined position and the predetermined direction respectively.

5. The game device according to claim 4, wherein
the instruction unit movably displays the character to-be-inputted, so as to reach a specific position on the touch panel, and instructs a timing at which the character to-be-inputted reaches the specific position as the contact timing.

6. The game device according to claim 5, wherein
the instruction unit displays a mark image in the main area corresponding to the character to-be-inputted, such that the mark image sequentially enlarges from a size smaller than the size of the main area, as the character to-be-inputted approaches the specific position and displays the mark image in the same size as that of the main area when the character to-be-inputted reaches the specific position.

7. The game device according to claim 5, wherein
the instruction unit displays an image, which indicates a slide direction of the character to-be-inputted, in the specific position on the touch panel.

8. A non-transitory computer-readable storage medium storing a program causing a computer, which has a touch panel and accepts an input by a flick operation including a contact operation and a slide operation on the touch panel, to execute a process, comprising:

an instructing step instructing a flick operation by displaying on the touch panel a screen that instructs a flick operation from a predetermined position in a predetermined direction on the touch panel at a predetermined timing;
a position detecting step detecting a contact start position on the touch panel by the flick operation;
a direction detecting step detecting the slide direction from the contact start position on the touch panel by the flick operation;
a timing detecting step detecting the contact timing on the touch panel by the flick operation; and
a determining step determining whether to accept or reject the flick operation based on a comparison between the detected contact start position and the predetermined position, a comparison between the detected slide direction and the predetermined direction, and a comparison between the detected contact timing and the predetermined timing.

9. The non-transitory computer-readable storage medium according to claim 8, wherein
the contact timing includes both a contact start timing at which a contact on the touch panel is started and a contact release timing at which the contact on the touch panel is released.

10. The non-transitory computer-readable storage medium according to claim 9, wherein
the determining step includes calculating a difference value between the contact start timing and the predetermined timing, and a difference value between the contact release timing and the predetermined timing, and determines whether to accept or reject the flick operation by using a greater one of the difference values.

11. The non-transitory computer-readable storage medium according to claim 8, wherein
a main area corresponding to each character of the "a" row of the Japanese kana syllabary is displayed on the touch panel and each character of the "a" row can be inputted by contacting the corresponding main area, and if a main area is contacted, sub-areas, corresponding to each character of the "i" row to the "o" row in the same column as the character of the "a" row in the contacted main area, are displayed around the main area which is contacted, and each character of the "i" row to the "o" row can be inputted by the slide operation from the main area to the sub-area, and
the instructing step includes displaying the character to-be-inputted on the touch panel, and instructing the main area that is to be contacted in order to input the character to-be-inputted, and the direction of slide from the main area to the sub-area, as the predetermined position and the predetermined direction respectively.

12. The non-transitory computer-readable storage medium according to claim 11, wherein
the instructing step includes movably displaying the character to-be-inputted, so as to reach a specific position on the touch panel, and instructing a timing at which the character to-be-inputted reaches the specific position as the contact timing.

13. The non-transitory computer-readable storage medium according to claim 12, wherein
the instructing step includes displaying a mark image in the main area corresponding to the character to-be-inputted, such that the mark image sequentially enlarges from a size smaller than the size of the main area, as the character to-be-inputted approaches the specific position and displays the mark image in the same size as that of the main area when the character to-be-inputted reaches the specific position.

14. The non-transitory computer-readable storage medium according to claim 12, wherein
the instructing step includes displaying an image, which indicates a slide direction of the character to-be-inputted, in the specific position on the touch panel.

15. A method implemented by a computer, which has a touch panel and accepts an input by a flick operation including a contact operation and a slide operation on the touch panel, to execute a process, comprising:
an instructing step instructing a flick operation by displaying on the touch panel a screen that instructs a flick operation from a predetermined position in a predetermined direction on the touch panel at a predetermined timing;
a position detecting step detecting a contact start position on the touch panel by the flick operation;
a direction detecting step detecting the slide direction from the contact start position on the touch panel by the flick operation;
a timing detecting step detecting the contact timing on the touch panel by the flick operation; and
a determining step determining whether to accept or reject the flick operation based on a comparison between the detected contact start position and the predetermined position, a comparison between the detected slide direction and the predetermined direction, and a comparison between the detected contact timing and the predetermined timing.

\* \* \* \* \*